(12) United States Patent
Gregory et al.

(10) Patent No.: US 12,087,005 B2
(45) Date of Patent: Sep. 10, 2024

(54) METHODS, SYSTEMS, AND APPARATUSES FOR STORAGE ANALYSIS AND MANAGEMENT

(71) Applicant: McKesson Corporation, San Francisco, CA (US)

(72) Inventors: Whitney Ann Gregory, Midlothian, VA (US); Hemanth Bandi, Richmond, VA (US); Dan Li, Tallahassee, FL (US); Devang Dhaka, Richmond, VA (US); Anshul Kumar, Ashburn, VA (US)

(73) Assignee: McKesson Corporation, Irving, TX (US)

( * ) Notice: Subject to any disclaimer, the term of this patent is extended or adjusted under 35 U.S.C. 154(b) by 422 days.

(21) Appl. No.: 17/474,943

(22) Filed: Sep. 14, 2021

(65) Prior Publication Data

US 2023/0081303 A1    Mar. 16, 2023

(51) Int. Cl.
*G06T 7/62* (2017.01)
*G06F 18/214* (2023.01)
*G06F 18/24* (2023.01)
*G06N 20/00* (2019.01)
*G06Q 10/0875* (2023.01)
*G06T 7/194* (2017.01)
*G06V 20/00* (2022.01)
*G06V 30/19* (2022.01)

(52) U.S. Cl.
CPC ............. *G06T 7/62* (2017.01); *G06F 18/214* (2023.01); *G06F 18/24* (2023.01); *G06N 20/00* (2019.01); *G06Q 10/0875* (2013.01); *G06T 7/194* (2017.01); *G06V 20/00* (2022.01); *G06T 2207/20081* (2013.01); *G06T 2207/20084* (2013.01); *G06V 30/19013* (2022.01)

(58) Field of Classification Search
CPC . G06T 7/62; G06T 7/194; G06T 2207/20081; G06T 2207/20084; G06T 7/11; G06F 18/214; G06F 18/24; G06N 20/00; G06N 3/08; G06Q 10/0875; G06V 20/00; G06V 30/19013; G06V 20/63; G06V 10/255
USPC .......................................................... 382/159
See application file for complete search history.

(56) References Cited

U.S. PATENT DOCUMENTS

| | | | |
|---|---|---|---|
| 2008/0077511 A1* | 3/2008 | Zimmerman | G06Q 10/087 705/28 |
| 2013/0235206 A1* | 9/2013 | Smith | G06Q 10/087 348/150 |
| 2014/0241623 A1* | 8/2014 | Wang | G06F 18/2148 382/160 |
| 2015/0332209 A1* | 11/2015 | DeBusk | G06K 19/07758 705/2 |
| 2017/0177877 A1* | 6/2017 | Suarez | G06F 21/6218 |
| 2019/0197466 A1* | 6/2019 | Hand, III | G06V 20/00 |

(Continued)

*Primary Examiner* — Ali Bayat
(74) *Attorney, Agent, or Firm* — Ballard Spahr LLP

(57) ABSTRACT

Described herein are methods, systems, and apparatuses for storage analysis and management using computer vision techniques. An imaging device may capture a series of images of a plurality of containers. The series of images may be analyzed by a classification model to determine a current capacity of each container. When the classification model determines that a current capacity of a container(s) satisfies a threshold(s), at least one remedial action may be performed.

20 Claims, 9 Drawing Sheets

(56) References Cited

U.S. PATENT DOCUMENTS

2021/0042724 A1\* 2/2021 Rathod ................ G07G 1/0054
2021/0304122 A1\* 9/2021 Dattamajumdar ........ G06T 7/74

\* cited by examiner

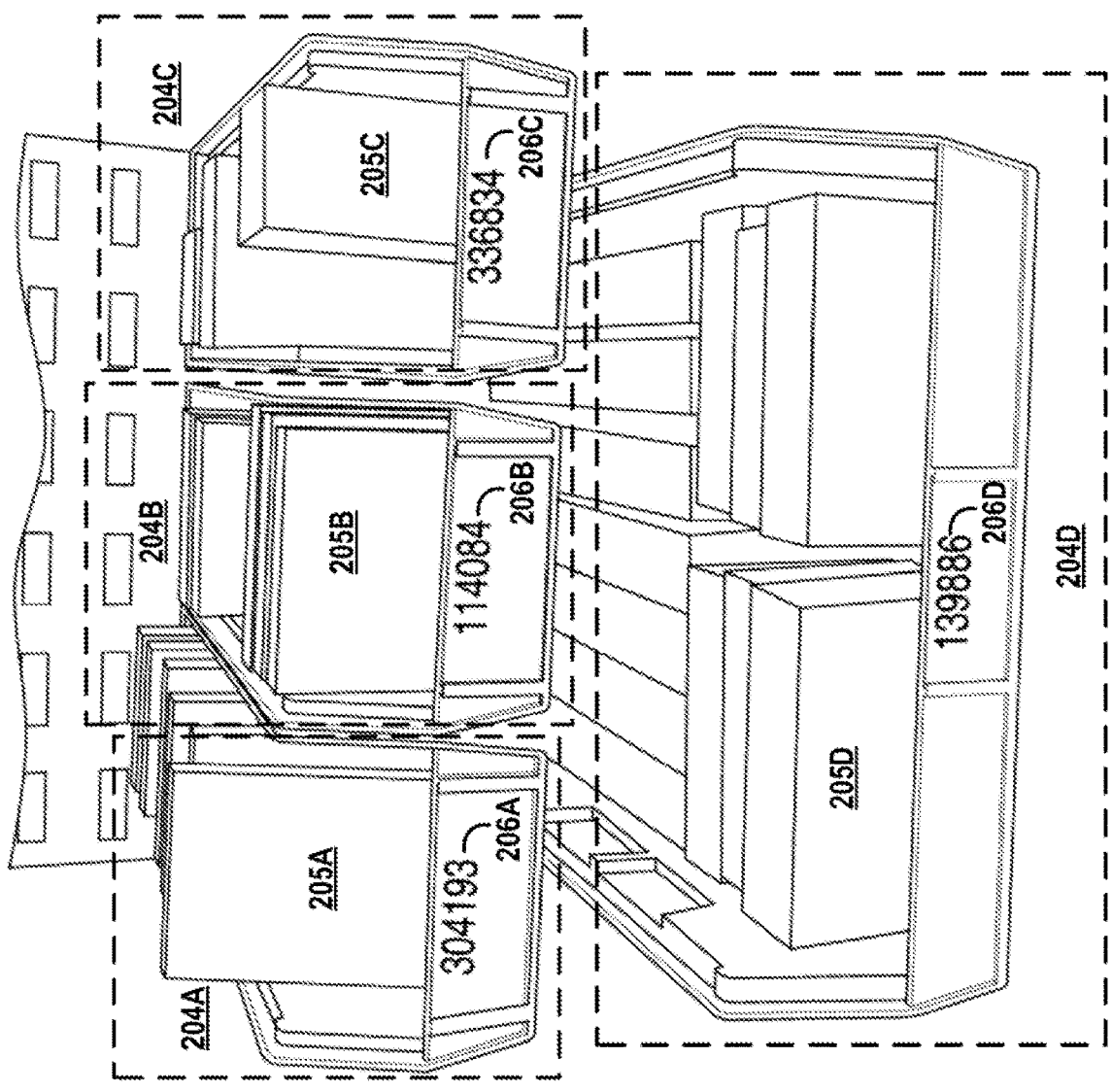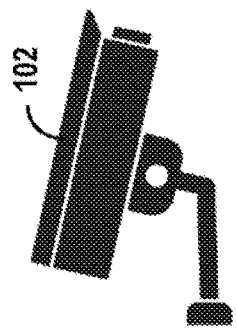
FIG. 2

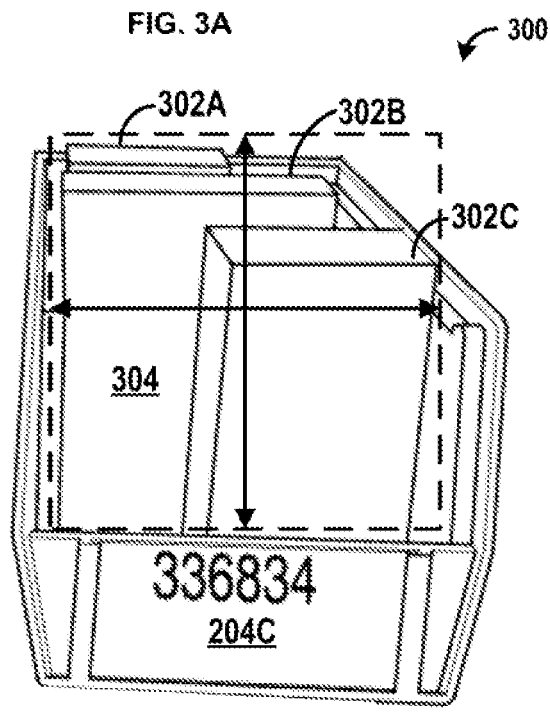
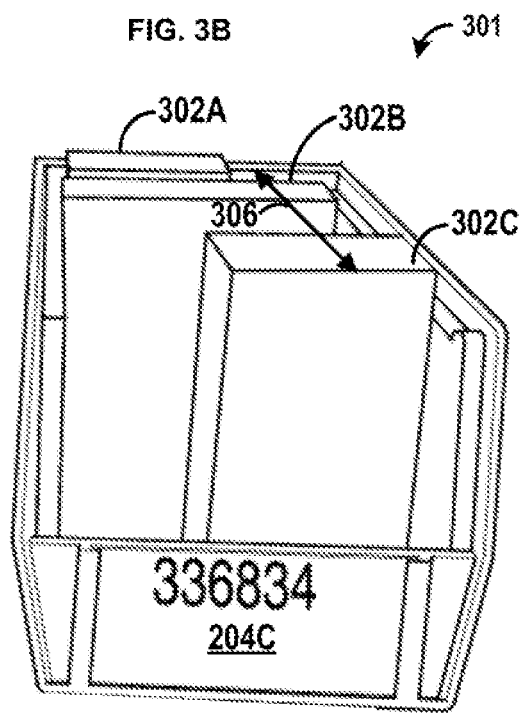

5th Floor Inventory Stocking Status  502

Number of Product tracked 504: 12

Last updated 506: Mar 3, 2020, 1:17 PM

Average Confidence level 508: 81.31

Product Filter 510A ▼ | room Filter 510B ▼ | floor Filter 510C ▼ | Status Filter 510D ▼

Percent Records 512

| Product ID ▼ | datetime | Confidence | Status |
|---|---|---|---|
| 1. X903n | Mar 3, 2020, 1:17 PM | 98.59 | Needs Attention |
| 2. J456Tq | Mar 3, 2020, 1:17 PM | 50.06 | Sufficient Stock |
| 3. E57H42 | Mar 3, 2020, 1:17 PM | 70.47 | Needs Attention |
| 4. A687B1 | Mar 3, 2020, 1:17 PM | 79.96 | Needs Attention |
| 5. 804840 | Mar 3, 2020, 1:17 PM | 86.35 | Needs Attention |
| 6. 777886 | Mar 3, 2020, 1:17 PM | 59.13 | Needs Attention |
| 7. 558794 | Mar 3, 2020, 1:17 PM | 70.47 | Needs Attention |
| 8. 336834 | Mar 3, 2020, 1:17 PM | 69.61 | Insufficient Stock |
| 9. 304687 | Mar 3, 2020, 1:17 PM | 91.71 | Sufficient Stock |
| 10. 304193 | Mar 3, 2020, 1:17 PM | 98.04 | Needs Attention |
| 11. 139886 | Mar 3, 2020, 1:17 PM | 96.52 | Insufficient Stock |
| 12. 11084 | Mar 3, 2020, 1:17 PM | 98.81 | Insufficient Stock |

Percent of Products in Each Status  514

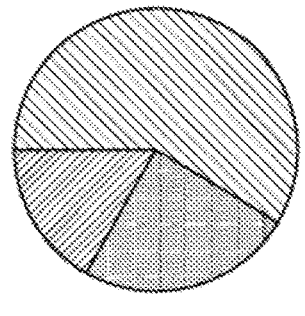

Product Info  516

| Product ID ▼ | Description | Floor | Room | Row Number | Bin Number |
|---|---|---|---|---|---|
| 1. X903n | gauze | 5 | 05.116 | 1 | 1 |
| 2. J456Tq | wipes | 5 | 05.116 | 2 | 1 |
| 3. E57H42 | Medical Items | 5 | 05.116 | 2 | 3 |
| 4. A687B1 | A687B1 | 5 | 05.116 | 4 | 3 |
| 5. 804840 | 804840 | 5 | 05.116 | 6 | 1 |

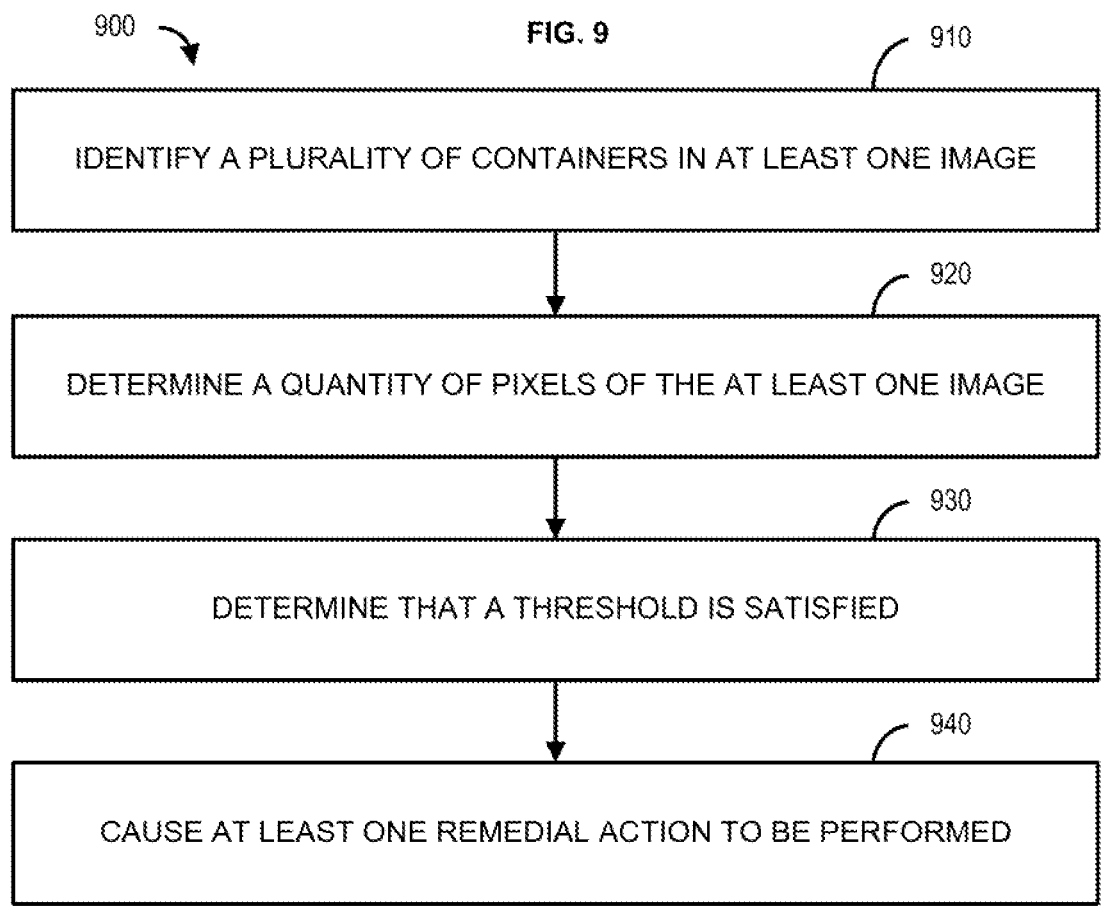

METHODS, SYSTEMS, AND APPARATUSES FOR STORAGE ANALYSIS AND MANAGEMENT

SUMMARY

It is to be understood that both the following general description and the following detailed description are exemplary and explanatory only and are not restrictive. Described herein are methods, systems, and apparatuses for storage analysis and management using computer vision techniques. A plurality of containers (e.g., storage units) may be monitored by at least one imaging device. The plurality of containers may be used to store a number of objects (e.g., supplies, boxes, items, etc.).

The at least one imaging device may capture a series of images of the plurality of containers at various times and/or at a set interval. The series of images may be analyzed by a trained classification model to determine a current capacity of each container. For example, the classification model may determine whether any of the images depicts a container(s) with a current capacity (e.g., less than half-full, 30% full, etc.) that satisfies a threshold(s). When the classification model determines that the current capacity of a container(s) satisfies a threshold(s), at least one remedial action may be performed The at least one remedial action may comprise, for example, an alert, a message, etc.

The capacity of each of the plurality of containers, as determined based on the series of images, may be provided at a user interface. For example, the user interface may indicate a current capacity of each of the plurality of containers as well as the particular object(s) within each container (e.g., type(s) of supply, box label(s), item name/label, etc.). The user interface may be indicative of the at least one remedial action, such as the message or the alert that may be generated when the classification model determines that the current capacity of a container(s) is satisfies the threshold(s).

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 2 shows an example system:
FIG. 3A shows an example container;
FIG. 3B shows an example container:
FIG. 5 shows an example interface;
FIG. 9 shows a flowchart for an example method.

DETAILED DESCRIPTION

Figure 1:
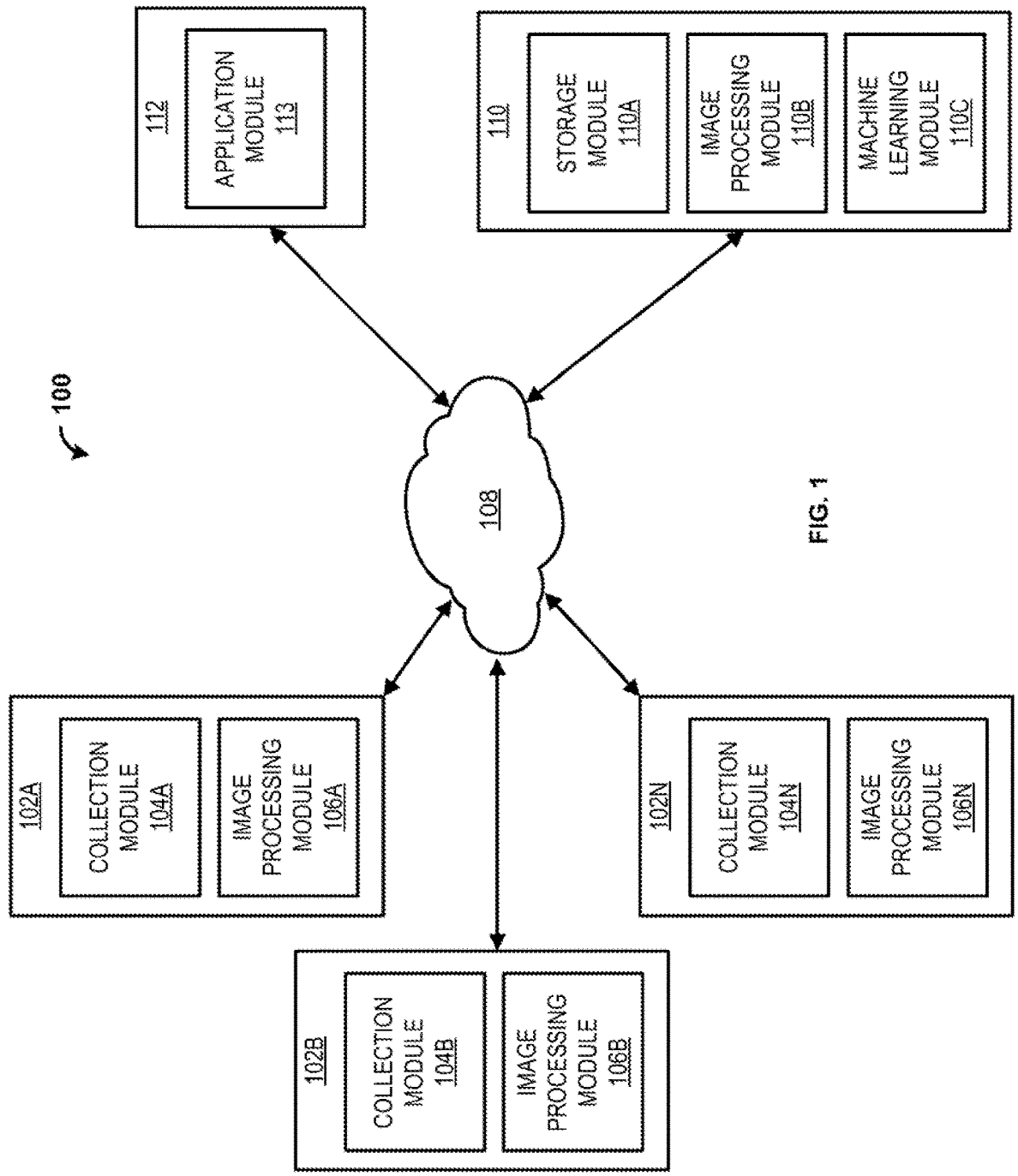
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises." means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium may be implemented. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Described herein are methods, systems, and apparatuses for storage analysis and management using computer vision techniques. A plurality of containers may be monitored by one or more imaging devices. The plurality of containers may comprise, for example, storage containers, shelves, buckets, boxes, etc. The plurality of containers may be used to store a number of objects, such as supplies, equipment, consumables, boxes, items, etc. Each container of the plurality of containers may store one or more of the objects, and each object and/or category of object may be inventoried.

The plurality of containers may be monitored by one or more imaging devices. For example, an imaging device may capture a series of images of the plurality of containers at various times and/or at a set interval. The imaging device may store the series of images at a collection module. At least one image of the series of images may be analyzed by an image processing module. The image processing module may comprise a classification model. The classification model may determine, for each container of the plurality of containers, a quantity of pixels of the at least one image that are associated with depicting a quantity of objects (e.g., a quantity of an inventoried item(s)) in the particular container. Based on the quantity of pixels corresponding to each container of the plurality of containers, the classification model may determine a current capacity of each container of the plurality of containers (e.g., an estimation of a number of objects presently stored in each container). The classification model may use one or more computer vision techniques, such as background subtraction, when determining the current capacity of each container. As another example, the classification model may use, or comprise, a neural network or any other suitable machine learning model, image classification model, etc., when determining the current capacity of each container.

The current capacity may relate to an amount of the particular object/inventoried item present within that particular container. For example, the image processing module (and/or the classification model) may determine the current capacity of each container based on an area and/or a depth associated with/depicting the quantity of objects. The amount of the particular object/inventoried item may be associated with a first threshold quantity. The first threshold quantity may comprise a known/preset quantity of pixels classified as depicting an object (e.g., versus depicting the container itself).

The image processing module (and/or the classification model) may use optical character recognition (OCR) to identify each container. For example, the at least one image may depict an identifier (e.g., a label, sticker, etc.) for at least one of the containers. The identifier may be proximate to the container, affixed to the container, etc. The identifier may comprise a string associated with the container and/or an object(s) present within the container. The image processing module (and/or the classification model) may use OCR to determine each identifier depicted in the at least one image.

The image processing module (and/or the classification model) may determine whether the current capacity of each container satisfies a first threshold of a plurality of thresholds. Determining whether the first threshold of the plurality of thresholds is satisfied may comprise determining whether the current capacity of the container is less than or equal to a first threshold quantity. For example, the first threshold quantity may correspond to an amount, ratio, percentage, etc., of pixels depicting the particular object/inventoried item. The first threshold may be satisfied when the current capacity of the container is less than or equal to the first threshold quantity.

The classification model may be trained using a plurality of training images. The plurality of containers may be present within each of the plurality of training images. At least one first training image of the plurality of training images may comprise the reference quantity of pixels discuss above. At least one second training image of the plurality of training images may comprise the quantity of pixels indicative of the current capacity of at least one container. The classification model may be trained using the at least one first training image and the at least one second training image.

The image processing module (and/or the classification model) may cause at least one remedial action to be performed. For example, the image processing module (and/or the classification model) may cause the at least one remedial action to be performed based on the first threshold being satisfied (e.g., based on the current capacity being less than or equal to the first threshold quantity). A user interface may be provided. The user interface may indicate a current capacity of each container of the plurality of containers. For example, the user interface may indicate which object(s)—or category(ies) of object(s)—is stored in each of the containers and a percentage or quantity of each presently stored in each container. The user interface may display an indication of the at least one remedial action. The user interface may depict other information as well, such as order history, inventory history, usage history, etc.

Turning now to FIG. 1, an example system 100 for storage analysis and management using computer vision techniques is shown. The system 100 may comprise a plurality of computing devices 102A, 102B, and 102N. Each of the plurality of computing devices 102A, 102B, 102N may comprise a collection module 104A, 104B, 104N and an image processing module 106A, 106B, 106N. Each image processing module 106A, 106B, 106N may comprise an imaging device, such as a still-image camera, a video camera, an infrared camera, an optical sensors, a combination thereof, and/or the like. Each of the plurality of computing devices 102A, 102B, 102N may be communication with a client device 112 and/or a server 110 via a network 106. The network 106 may be configured to use a variety of network paths, protocols, devices, and/or the like for communication. The network 106 may have a plurality of communication links connecting each of the device shown in the system 100. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The client device 112 may comprise a computing device, a mobile device, a smart device, a combination thereof, and/or the like. The client device 112 may comprise an application module 113, as further described herein with respect to FIG. 5. The server 110 may comprise one or more computing devices comprising a storage module 110A (e.g., a storage medium(s)), an imaging processing module 110B, and a machine learning module 110C.

Turning now to FIG. 2, a system 200 is shown. The system 200 may comprise an imaging device 102. The imaging device 102 may correspond to one or more of the computing devices 102A, 102B, 102N. For example, the imaging device 102 may correspond to any of the image processing modules 106A, 106B. 106N and/or the imaging device thereof (e.g., a still-image camera, a video camera, an infrared camera, an optical sensors, a combination thereof, and/or the like). The system 200 may comprise a plurality of containers 204A-204D. The plurality of containers 204A-204D may comprise, for example, storage containers, shelves, buckets, boxes, etc. The plurality of containers 204A-204D may be used to store a number of objects 205A-205D, such as supplies, equipment, consumables, boxes, items, etc. The plurality of containers 204A-204D may be located in a fixed space, such as within an inventory room, a storage room, a closet, etc. Each container of the plurality of containers 204A-204D may store one or more of the objects 205A-205D, and each objects 205A-205D—and/or category of object—may be inventoried. For example, a first container 204A may store a first type of object 205A (e.g., medical supply X), and a second container 204B may store a second type of object 205B (e.g., medical supply Y). As another example, a third container 204C may store a first category of object 205C (e.g., multiple objects that are similar but not identical), and a second container may store a second category, a type of object, a combination thereof, and/or the like.

The plurality of containers 204A-204D may be monitored by the imaging device 102 and/or another imaging device(s) (not shown). For example, the imaging device 102 may comprise a camera or a computing device comprising an optical sensor, and the imaging device 102 may be situated proximate to the plurality of containers 204A-204D. The imaging device 102 may capture a series of images of the plurality of containers 204A-204D at various times (e.g., predetermined times/according to a schedule) and/or at a set interval (e.g., every N minute, hour, day, etc.).

As described herein, the imaging device 102 may correspond to any of the image processing modules 106A, 106B, 106N. Each of the image processing modules 106A, 106B, 106N may comprise one or more sensors. The one or more sensors may detect objects, persons, conditions, etc., before, during, or after the series of images of the plurality of containers 204A-204D are captured. For example, the one or more sensors may comprise a thermal sensor that may detect when one or more persons are proximate to the plurality of containers 204A-204D (e.g., within a field of view of the imaging device 102). When one or more persons are detected, the one or more sensors may send a corresponding indication to the imaging device 102 (e.g., the corresponding image processing modules 106A, 106B, 106N), and the series of images may not be captured while the one or more persons are detected.

As another example, the one or more sensors may comprise a motion sensor that may detect when persons and/or objects (e.g., carts, boxes, etc.) are proximate to the plurality of containers 204A-204D (e.g., within the field of view of the imaging device 102). When persons and/or objects are detected, the one or more sensors may send a corresponding indication to the imaging device 102 (e.g., the corresponding image processing modules 106A, 106B. 106N), and the series of images may not be captured while the persons and/or objects are detected.

As a further example, the one or more sensors may comprise a light sensor that may determine when lighting conditions proximate to the plurality of containers 204A-204D (e.g., within the field of view of the imaging device 102) are not conducive to capturing the series of images (e.g., too dark, too bright, etc.). When such lighting conditions are determined, the one or more sensors may send a corresponding indication to the imaging device 102 (e.g., the corresponding image processing modules 106A, 106B, 106N), and the series of images may not be captured while the lighting conditions are present.

In still a further example, as described herein, the plurality of containers 204A-204D may be located in a fixed space, such as within an inventory room, a storage room, a closet, etc. The fixed space may comprise at least one entryway (e.g., a door, a gate, etc.) The one or more sensors may be in communication with at least one entry sensor at the at least one entryway (e.g., a door sensor, a gate sensor, etc.). The at least one entry sensor may indicate to the one or more sensors when the at least one entryway is closed or ajar (e.g., at least partially open). The imaging device 102 may be configured to capture the series of images when the at least one entry sensor indicates that the at least one entryway is closed. Other examples for the one or more sensors and configurations thereof are possible as well.

The imaging device 102 may send the series of images to a collection module for storage. The collection module may be resident at the imaging device 102 or it may be resident at another device, such as a computing device, a server, a cloud device, etc. For example, the imaging device 102 may send the images to any of the collection modules 104A, 104B, 104N of the plurality of computing devices 102A, 102B, 102N. As another example, the imaging device 102 may send the images to the storage module 110A (or any of the computing devices 102A, 102B, 102N may send the images received from the imaging device 102 to the storage module 110A). Each of the collection modules 104A, 104B. 104N may comprise, or be in communication with, one or more storage mediums.

At least one image of the series of images sent by the imaging device 102 may be analyzed by an image processing module. The image processing module may be resident at the imaging device or it may be resident at another device, such as a computing device, a server, a cloud device, etc. For purposes of explanation, the description herein will describe the imaging processing module 110B of the server 110 as the module that receives and analyzes the images, however, it is to be understood that any of the image processing modules 106A, 106B, 106N may similarly receive and process any of the images captured by the imaging device 102. As described herein, the server 110 may comprise a machine learning module 110C. The machine learning module 110C may comprise a classification model. The classification model may comprise one or more machine learning models, artificial intelligence models, a combination thereof, and/or the like. For example, the classification model may use, or comprise, a neural network, an image classification model, etc. The classification model as described herein may also be resident within (or a module/component of) any of the image processing modules 106A, 106B, 106N of the plurality of computing devices 102A, 102B, 102N. In examples where the classification model is resident within (or a module/component of) any of the image processing modules 106A, 106B, 106N, it is to be understood that the image processing modules 106A, 1063, 106N may perform any of the steps described herein with respect to the classification model.

The classification model may determine, for each container of the plurality of containers 204A-204D, a quantity of pixels of at least one image that are associated with/depicting a quantity of objects 205A-205D (e.g., a quantity of an inventoried item(s)) in the particular container. Based on the quantity of pixels corresponding to each container of the plurality of containers, the classification model may determine a current capacity of each container of the plurality of containers 204A-204D (e.g., an estimation of a number of objects presently stored in each container). The classification model may use one or more computer vision techniques, such as background subtraction, when determining the current capacity of each container. As another example, the classification model may use, or comprise, a neural network or any other suitable machine learning model, image classification model, etc., when determining the current capacity of each container. Some examples of background subtraction techniques the classification model may use may include a temporal average filter algorithm, a frame differencing algorithm, a mean filter algorithm, a running Gaussian average algorithm, a background mixture algorithm, a combination thereof, and/or the like.

For example, the classification model may use background subtraction to determine an amount of change/difference between pixels in a reference image(s) of each container compared to the at least one image of each container. The reference image(s) may depict one or more of the plurality of containers 204A-204D at a known capacity. For example, the reference image(s) may depict each container of the plurality of containers 204A-204D at a full capacity with respect to the particular object(s) presently stored in each container (e.g., full capacity may vary depending on object type-category. The reference image(s) will be discussed further herein with respect to FIG. 4.

As discussed above, the classification model may determine, for each container of the plurality of containers 204A-204D, based on the quantity of pixels in the at least one image, the current capacity of each corresponding container. The current capacity may relate to an amount of the particular object/inventoried item 205A-205D present within that particular container of the plurality of containers 204A-204D. For example, as shown in the example images 300 and 301 of FIGS. 3A and 3B, the image processing module 1108 (and/or the classification model) may determine the current capacity of each container of the plurality of containers 204A-204D based on an area 304 (FIG. 3A) and/or a depth 306 (FIG. 3B) associated with/depicting a quantity of objects 302A-302C. As shown in FIG. 3A, the area 304 may correspond to a portion of the image 300 of the container 204C depicting the quantity of objects 302A-302C. As shown in FIG. 38, the depth 306 may correspond to a portion of the image 301 of the container 204C depicting the quantity of objects 302A-302C.

The area 304 and/or the depth 306 may be determined based on a total quantity of pixels associated with the container 204C minus the quantity of pixels associated with/depicting the quantity of objects 302A-302C present in the container 204C (e.g., total pixels for the container 204C minus those pixels that depict the object(s) present within the container 204C). In making this determination, the image processing module 110B (and/or the classification model) may use image segmentation methods—or similar to identify pixels within the images 300,301 that correspond to edges of the container 204C. Once the image processing module 110B (and/or the classification model) determines the edges of the container 204C, the image processing module 110B (and/or the classification model) may classify each pixel bounded by the edges of the particular container 204C. Each pixel bounded by the edges of the container 204C may be classified as being associated with one of more of the objects 302A-302C or with the container 204C itself.

Figure 6:
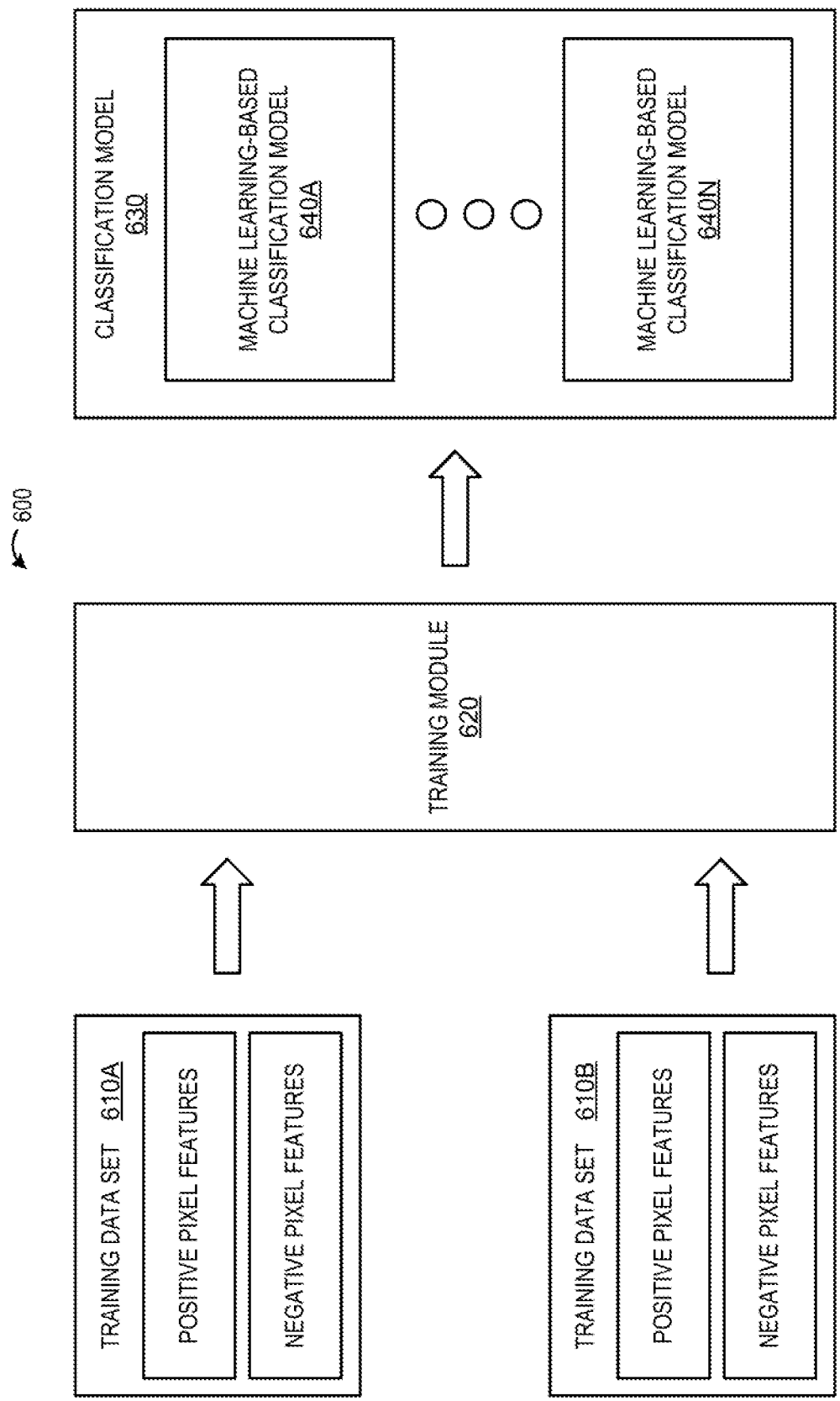
FIG. 6 shows an example system.

For example, as further described herein with respect to FIGS. 5 and 6, the image processing module 110B (and/or the classification model) may determine a plurality of pixel features associated with each pixel in the images 300,301. The plurality of pixel features may be used by the image processing module 110B (and/or the classification model) to determine a prediction as to whether the given pixel is associated with one of more of the objects 302A-302C or with the container 204C itself. The background subtraction techniques discussed above may then be used by the image processing module 110B (and/or the classification model) to determine a difference (e.g., an amount of change) between pixels in a reference image(s) of the container 204C compared to the images of the container 204C.

Figure 4A:
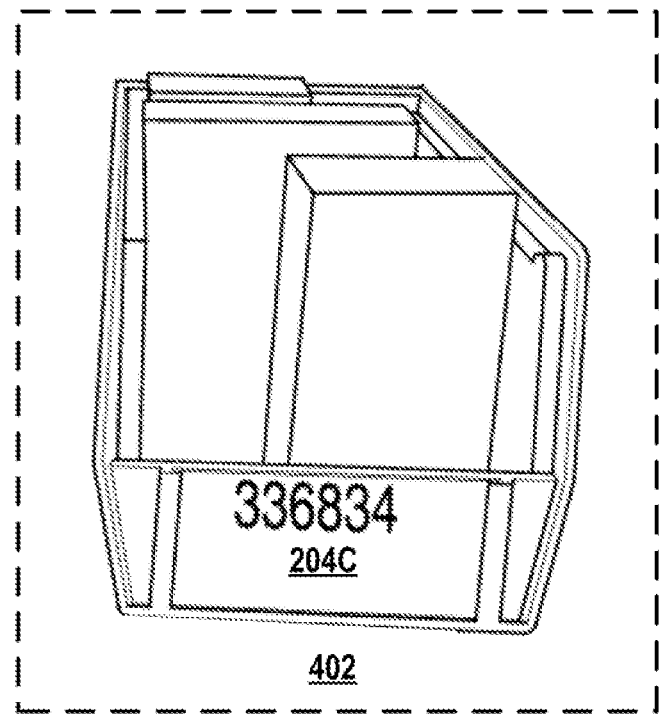
FIG. 4A shows an example image.
Figure 4B:
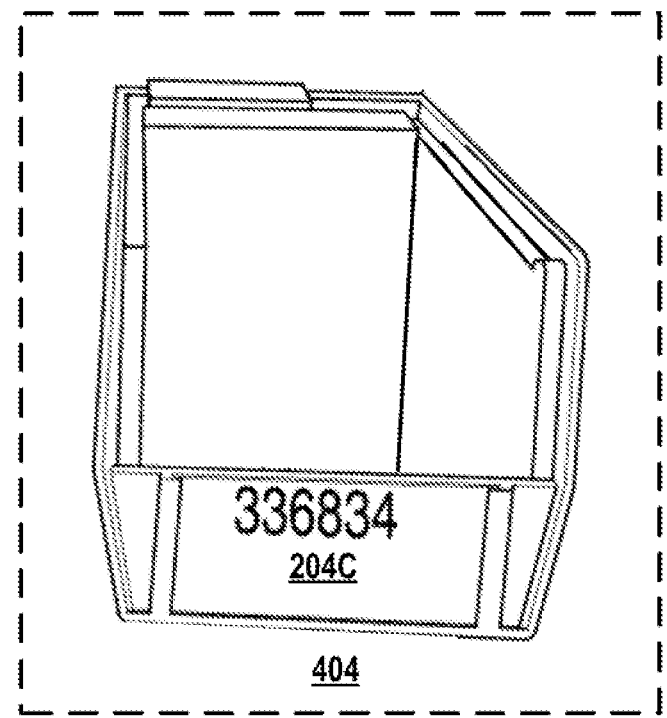
FIG. 4B shows an example image.

FIG. 4A shows an example reference image 402 of the container 204C. The reference image 402 may depict the container 204C at full capacity, and the reference image 402 may be associated with a corresponding number, ratio, etc., of pixels to indicate the full capacity. FIG. 4B shows an example reference image 404 of the container 204C. The reference image 404 may depict the container 204C at less-than-full capacity, and the reference image 404 may be associated with a corresponding number, ratio, etc., of pixels to indicate the less-than-full capacity. The difference (e.g., amount of change) between pixels in the reference images 402,404 of the container 204C compared to the image 300,301 of the container 204C may be indicative of the current capacity of that particular container (e.g., depending on whether the area 304 is used or the depth 306 is used). The current capacity may be expressed as a whole number (e.g., 100 pixels depicting an object(s) 302A-302C), a ratio (e.g., 100 out of 10,000 pixels depicting an object(s) 302A-302C) a percentage (e.g., 80% of pixels are classified as depicting an object(s) 302A-302C), a combination thereof, and/or the like.

As noted above, the current capacity of the container 204C may relate to an amount of the particular object/inventoried item 302A-302C present within the container 204C. The amount of the particular object/inventoried item 302A-302C may be associated with a first threshold quantity. For example, the image processing module 1108 (and/or the classification model) may determine the first threshold quantity based on a reference quantity of pixels within the reference image(s) 402,404 and the quantity of pixels in the at image(s) 300,301 that are associated with/depicting the quantity of objects 302A-302C present in each container 204C. The reference quantity of pixels in the reference image(s) 402,404 may depict the container 204C with a quantity of objects 302A-302C in that corresponds to the first threshold quantity. The reference quantity of pixels may be expressed as a whole number, (e.g., 100 pixels), a ratio (e.g., 100 out of 10,000 pixels) a percentage (e.g., 80% of pixels are classified as depicting an object(s)), a combination thereof, and/or the like. The first threshold quantity may comprise a known/preset quantity of pixels classified as depicting an object 302A-302C (e.g., versus depicting the container 204C itself). The reference quantity of pixels, as well as the first threshold quantity, may each be associated with a known/particular capacity of the container 204C (e.g., based on corresponding quantities of pixels classified as depicting objects 302A-302C vs. the container 204C).

The image processing module 110B (and/or the classification model) may use optical character recognition (OCR) to identify each container of the plurality of containers 204A-204D. For example, at least one image captured by the imaging device 102 of the plurality of containers 204A-204D may depict an identifier 206A-206D (e.g., a label, sticker, etc.). Each identifier 206A-206D may be proximate to each container 204A-204D, affixed to each container 204A-204D, etc. Each identifier 206A-206D may comprise a string associated with a corresponding container 204A-204D and/or an object(s) present within the corresponding container 204A-204D. The string for each identifier 206A-206D may comprise any number of alphanumeric characters, symbols, etc. Each identifier 206A-206D may be associated with a particular object and/or category thereof (e.g., inventoried item) corresponding to the particular container.

The image processing module 110B (and/or the classification model) may use OCR to determine each identifier 206A-206D depicted in the at least one image. The image processing module 110B (and/or the classification model) may indicate the current capacity of each container of the plurality of containers 204A-204D and that container's particular identifier 206A-206D. For example, an identifier 206A for the container 204A may comprise the numerical string of "304193," and the current capacity for the container 204A may comprise a percentage value of "65%" (e.g., 65% pixels associated with the container 204A are classified as depicting an object(s)). The image processing module 110B (and/or the classification model) may store an indication of that the identifier 206A (e.g., the numerical string of "304193") along with an indication of the percentage value of "65%." Similar indications may be stored for each of the remaining containers of the plurality of containers 204A-204D.

The image processing module 110B (and/or the classification model) may determine whether the current capacity of each container of the plurality of containers 204A-204D satisfies a first threshold of a plurality of thresholds. Each of the plurality of thresholds may correspond to a capacity level (e.g., a percentage, ratio, etc., indicating a level of "fullness" of each container of the plurality of containers 204A-204D). For example, the first threshold may correspond to a capacity level that indicates a particular container of the plurality of containers 204A-204D needs to be refilled and/or the corresponding object(s) stored therein need to be restocked, ordered, etc. The image processing module 110B (and/or the classification model) may determine whether the current capacity of each container of the plurality of containers 204A-204D, as indicated by the at least one image, satisfies the first threshold.

For example, the image processing module 110B (and/or the classification model) may determine whether the current capacity of each container of the plurality of containers 204A-204D, as indicated by the at least one image, satisfies the first threshold by determining whether the current capacity of each container of the plurality of containers 204A-204D meets or exceeds (or falls below, as the case may be) the first threshold. The image processing module 110B (and/or the classification model) may determine that the first threshold is satisfied based on the current capacity of each container of the plurality of containers 204A-204D. For example, the current capacity of each container of the plurality of containers 204A-204D may comprise a capacity level (e.g., 50%) that triggers the first threshold (e.g., capacity levels less than or equal to 50%, capacity levels greater than or equal to 50%, etc.). The capacity level of each container of the plurality of containers 204A-204D may correspond to a quantity of the particular object/inventoried item associated with that container (e.g., presently stored within that container).

The first threshold quantity discussed above may comprise a quantity of pixels depicting the particular object/inventoried item that corresponds to the first threshold. The first threshold quantity may comprise a known % preset quantity of pixels classified as depicting an object (e.g., versus depicting the container itself). The reference quantity of pixels, as well as the first threshold quantity, may each be associated with a known/particular capacity of the corresponding container of the plurality of containers 204A-204D (e.g., based on corresponding quantities of pixels classified as depicting objects vs. containers). Determining whether the first threshold of the plurality of thresholds is satisfied may comprise determining whether the current capacity of the container is less than or equal to the first threshold quantity. For example, the first threshold quantity may correspond to an amount, ratio, percentage, etc., of pixels depicting the particular object/inventoried item. The first threshold may be satisfied when the current capacity of the container is less than or equal to the first threshold quantity. For example, the first threshold may comprise an indication of "less than or equal to 50% of pixels" (e.g., 50% of pixels depicting an object(s)), and the current capacity of the container may be indicative of "49% of pixels" depicting an object(s) within that container. The first threshold in this example may be satisfied, because the current capacity is less than the first threshold quantity.

The image processing module 110B (and/or the classification model) may cause at least one remedial action to be performed. For example, the image processing module 110B (and/or the classification model) may cause the at least one remedial action to be performed based on the first threshold being satisfied (e.g., based on the current capacity being less than or equal to the first threshold quantity). Causing the at least one remedial action to be performed may comprise causing a computing device, such as the client device 112, to output an alert. The alert may comprise a notification at a user interface, such as the user interface 500 described further herein. The alert may comprise an identifier 206A-206D associated with at least one container of the plurality of containers 204A-204D. The alert may also comprise a quantity/amount of at least one object (e.g., an inventoried item) presently stored within at least one container of the plurality of containers 204A-204D as indicated by the current capacity of that container. As another example, causing the at least one remedial action to be performed may comprise determining, based on the current capacity of at least one container of the plurality of containers 204A-204D, a quantity of at least one object (e.g., an inventoried item) presently stored within that at least one container of the plurality of containers 204A-204D. As a further example, causing the at least one remedial action to be performed may comprise sending a message. The message may comprise an identifier 206A-206D associated with at least one container of the plurality of containers 204A-204D. The message may also comprise a quantity/amount of at least one object (e.g., an inventoried item) presently stored within at least one container of the plurality of containers 204A-204D as indicated by the current capacity of that container. The at least one remedial action may also comprise causing a quantity/amount of the at least one object (e.g., the inventoried item) to be ordered, purchased, etc. For example, the message may comprise the quantity/amount of the at least one object may comprise a purchase quantity/amount. The message in such an example may be sent to a computing device associated with an ordering system. Other examples are possible as well.

FIG. 5 shows an example user interface 500. The user interface may be displayed/output at the client device 112 via the application module 113. The user interface 500 may indicate a current capacity and other information relating to the plurality of containers 204A-204D, such as the "Product Info" shown in the lower-right quadrant 516 of the user interface 500. The user interface 500 may indicate which object(s)—or category(ies) of object(s)—is stored in each of the containers of the plurality of containers 204A-204D and a percentage or quantity of each presently stored in each container in a given status, such via a chart shown in the center-right quadrant 512 of the user interface 500. The user interface 500 may display an indication of the at least one remedial action discussed above (e.g., the alert, message, etc.), such as the "Status" shown in the lower-left quadrant 512 of the user interface 500. The user interface 500 may depict other information as well, such as order history, inventory history, usage history, location information 502, object count 504, update information 506, and confidence level 508 (e.g., relating to a prediction of each container's status).

The user interface 500 may comprise a plurality of filters 510A-510C. The plurality of filters 510A-510C may allow a user of the client device 112 to filter the information provided at the user interface 500 by Product 510A, Room 510B, Floor 510C, and/or Status 510D. Other types of filters are possible as well. The plurality of filters 510A-510C described herein are meant to be exemplary only.

The classification model and/or the machine learning module 110C may be trained using a plurality of training images. The plurality of containers 204A-204D may be present within each of the plurality of training images. At least one first training image of the plurality of training images may comprise the reference quantity of pixels discuss above. At least one second training image of the plurality of training images may comprise the quantity of pixels indicative of the current capacity of at least one container of the plurality of containers 204A-204D. As further described herein, the classification model and/or the machine learning module 110C may be trained using the at least one first training image and the at least one second training image.

Turning now to FIG. 6, a system 600 for storage analysis and management using computer vision techniques is shown. The system 600 may be configured to use machine learning techniques to train, based on an analysis of one or more training datasets 610A-610B by a training module 620, at least one classification model 630. The one or more training datasets 610A-6108 may correspond to the plurality of training images discussed above. The classification model and/or the machine learning module 110C may comprise the at least one classification model 630.

The at least one classification model 630, once trained, may be configured to determine any pixel in any of the images of the plurality of containers 204A-204D captured by the imaging device 102 depicts or does not depict an object/item (e.g., versus depicting a container itself). For example, the at least one classification model 630, once trained as described herein, may determine a plurality of pixel features associated with each pixel in the images 300,301. The plurality of pixel features may be used by the at least one classification model 630 to determine a prediction as to whether a given pixel is associated with one of more of the objects 302A-302C or with a container itself. The background subtraction techniques discussed above may then be used by the image processing module 110B (and/or the classification model) to determine a difference (e.g., an amount of change) between pixels in a reference image(s) of the container compared to the images of the container.

Returning to FIG. 6, a dataset indicative of a plurality of images of the plurality of containers 204A-204D captured by the imaging device 102 and a labeled (e.g., predetermined/known) prediction regarding each pixel thereof may be used by the training module 620 to train the at least one classification model 630. Each pixel of each of the plurality of images of the plurality of containers 204A-204D captured by the imaging device 102 in the dataset may be associated with one or more pixel-based features. The one or more pixel-based features and the labeled prediction regarding each pixel thereof may be used to train the at least one classification model 630.

The training dataset 610A may comprise a first portion of the plurality of images of the plurality of containers 204A-204D captured by the imaging device 102 in the dataset. Each pixel of image in the first portion may have a labeled (e.g., predetermined) prediction and one or more labeled pixel-based features. The training dataset 610B may comprise a second portion of the plurality of images of the plurality of containers 204A-204D captured by the imaging device 102 in the dataset. Each image in the second portion may have a labeled (e.g., predetermined) prediction and one or more labeled pixel-based features. The plurality of images of the plurality of containers 204A-204D captured by the imaging device 102 may be randomly assigned to the training dataset 610A, the training dataset 610B, and/or to a testing dataset. In some implementations, the assignment of one or more images of the plurality of images to a training dataset or a testing dataset may not be completely random. In this case, one or more criteria may be used during the assignment, such as ensuring that similar numbers of images with different predictions and/or pixel-based features are in each of the training and testing datasets. In general, any suitable method may be used to assign the images to the training or testing datasets, while ensuring that the distributions of predictions and/or pixel-based features are somewhat similar in the training dataset and the testing dataset.

The training module 620 may use the first portion and the second portion of the plurality of images to determine one or more pixel-based features that are indicative of a high prediction (e.g., depicting an object/inventoried item). That is, the training module 620 may determine which pixel-based features present within the plurality of images are correlative with a high prediction. The one or more pixel-based features indicative of a high prediction may be used by the training module 620 to train the classification model 630. For example, the training module 620 may train the classification model 630 by extracting a feature set (e.g., one or more pixel-based features) from the first portion in the training dataset 610A according to one or more feature selection techniques. The training module 620 may further define the feature set obtained from the training dataset 610A by applying one or more feature selection techniques to the second portion in the training dataset 610B that includes statistically significant features of positive examples (e.g., high predictions) and statistically significant features of negative examples (e.g., low predictions). The training module 620 may train the classification model 630 by extracting a feature set from the training dataset 610B that includes statistically significant features of positive examples (e.g., high predictions) and statistically significant features of negative examples (e.g., low predictions).

The training module 620 may extract a feature set from the training dataset 610A and/or the training dataset 610B in a variety of ways. For example, the training module 620 may extract a feature set from the training dataset 610A and/or the training dataset 610B using a classification module. The training module 620 may perform feature extraction multiple times, each time using a different feature-extraction technique. In one example, the feature sets generated using the different techniques may each be used to generate different machine learning-based prediction models 640. For example, the feature set with the highest quality examples may be selected for use in training. The training module 620 may use the feature set(s) to build one or more machine learning-based prediction models 640A-640N that are configured to determine a prediction for a particular image(s) and/or pixel(s).

The training dataset 610A and/or the training dataset 610B may be analyzed to determine any dependencies, associations, and/or correlations between pixel-based features and the labeled predictions in the training dataset 610A and/or the training dataset 610B. The identified correlations may have the form of a list of pixel-based features that are associated with different labeled predictions (e.g., depicting vs. not depicting an object/inventoried item). The pixel-based features may be considered as features (or variables) in a machine learning context. The term "feature," as used herein, may refer to any characteristic of an item of data that may be used to determine whether the item of data falls within one or more specific categories or within a range. By way of example, the features described herein may comprise one or more pixel-based features that may be correlative (or not correlative as the case may be) with objects vs. containers being depicted or not depicted within a particular image and/or pixel.

A feature selection technique may comprise one or more feature selection rules. The one or more feature selection rules may comprise a pixel-based feature occurrence rule. The pixel-based feature occurrence rule may comprise determining which pixel-based features in the training dataset 610A occur over a threshold number of times and identifying those pixel-based features that satisfy the threshold as candidate features. For example, any pixel-based features that appear greater than or equal to 5 times in the training dataset 610A may be considered as candidate features. Any pixel-based features appearing less than 5 times may be excluded from consideration as a feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the pixel-based feature occurrence rule may be applied to the training dataset 610A to generate a first list of pixel-based features. A final list of candidate pixel-based features may be analyzed according to additional feature selection techniques to determine one or more candidate pixel-based feature groups (e.g., groups of pixel-based features that may be used to determine a prediction). Any suitable computational technique may be used to identify the candidate pixel-based feature groups using any feature selection technique such as filter, wrapper, and/or embedded methods. One or more candidate pixel-based feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 600. Instead, features may be selected on the basis of scores in various statistical tests for their correlation with the outcome variable (e.g., a prediction).

As another example, one or more candidate pixel-based feature groups may be selected according to a wrapper method. A wrapper method may be configured to use a subset of features and train the classification model 630 using the subset of features. Based on the inferences that may be drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate pixel-based feature groups. Forward feature selection is an iterative method that begins with no features. In each iteration, the feature which best improves the model is added until an addition of a new variable does not improve the performance of the model. As another example, backward elimination may be used to identify one or more candidate pixel-based feature groups. Backward elimination is an iterative method that begins with all features in the model. In each iteration, the least significant feature is removed until no improvement is observed on removal of features. Recursive feature elimination may be used to identify one or more candidate pixel-based feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate pixel-based feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 620 has generated a feature set(s), the training module 620 may generate the one or more machine learning-based prediction models 640A-640N based on the feature set(s). A machine learning-based prediction model (e.g., any of the one or more machine learning-based prediction models 640A-640N) may refer to a complex mathematical model for data classification that is generated using machine-learning techniques as described herein. In one example, a machine learning-based prediction model may include a map of support vectors that represent boundary features. By way of example, boundary features may be selected from, and/or represent the highest-ranked features in, a feature set.

The training module 620 may use the feature sets extracted from the training dataset 610A and/or the training dataset 610B to build the one or more machine learning-based prediction models 640A-640N for each classification category (e.g., an object/inventoried item is (or is not) depicted/present within a given pixel). In some examples, the one or more machine learning-based prediction models 640A-640N may be combined into a single machine learning-based prediction model 640 (e.g., an ensemble model). Similarly, the classification model 630 may represent a single classifier containing a single or a plurality of machine learning-based prediction models 640 and/or multiple classifiers containing a single or a plurality of machine learning-based prediction models 640 (e.g., an ensemble classifier).

The extracted features (e.g., one or more candidate pixel-based features) may be combined in the one or more machine learning-based prediction models 640A-640N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting classification model 630 may comprise a decision rule or a mapping for each candidate pixel-based feature in order to assign a prediction to a class (e.g., depicted vs. not depicted). As described herein, the classification model 630 may be used to determine predictions for images/pixels. The candidate pixel-based features and the classification model 630 may be used to determine predictions for images/pixels in the testing dataset.

Figure 7:
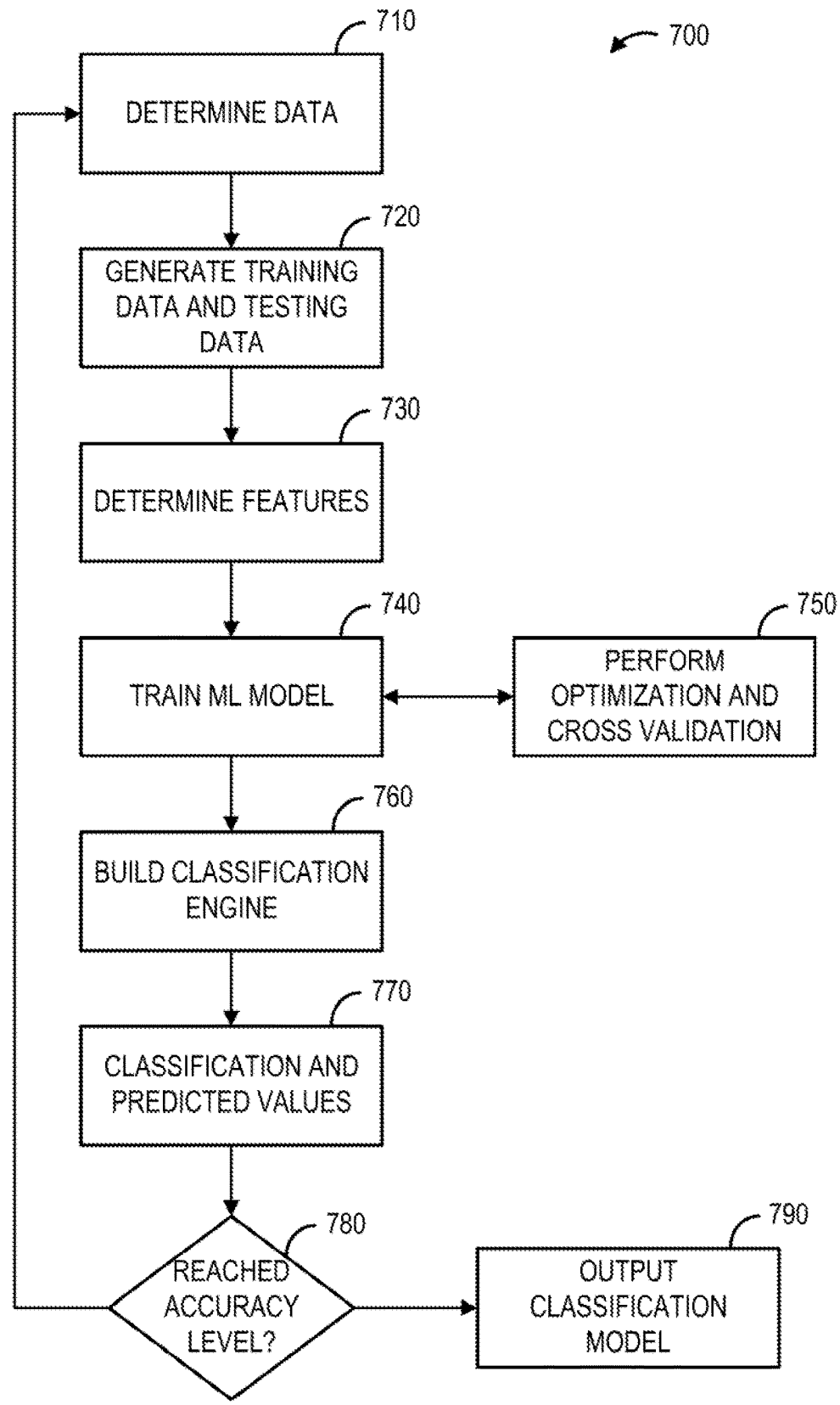
FIG. 7 shows a flowchart for an example method.

FIG. 7 is a flowchart illustrating an example training method 700 for generating the classification model 630 using the training module 620. The training module 620 may implement supervised, unsupervised, and/or semi-supervised (e.g., reinforcement based) machine learning-based prediction models 640A-640N. The method 700 illustrated in FIG. 7 is an example of a supervised learning method; variations of this example of training method are discussed below, however, other training methods may be analogously implemented to train unsupervised and/or semi-supervised machine learning models. The method 700 may be implemented by any of the devices shown in the system 100.

At step 710, the training method 700 may determine (e.g., access, receive, retrieve, etc.) first images and second images. The first images and the second images may each comprise one or more pixel-based features and a predetermined prediction. The training method 700 may generate, at step 720, a training dataset and a testing dataset. The training dataset and the testing dataset may be generated by randomly assigning images from the first images and/or the second images to either the training dataset or the testing dataset. In some implementations, the assignment of images as training or test samples may not be completely random. As an example, only the images for a specific pixel-based feature(s) and/or range(s) of predetermined predictions may be used to generate the training dataset and the testing dataset. As another example, a majority of the images for the specific pixel-based feature(s) and/or range(s) of predetermined predictions may be used to generate the training dataset. For example, 75% of the images for the specific pixel-based feature(s) and/or range(s) of predetermined predictions may be used to generate the training dataset and 25% may be used to generate the testing dataset.

The training method 700 may determine (e.g., extract, select, etc.), at step 730, one or more features that may be used by, for example, a classifier to differentiate among different classifications (e.g., predictions). The one or more features may comprise a set of pixel-based features. As an example, the training method 700 may determine a set features from the first images. As another example, the training method 700 may determine a set of features from the second images. In a further example, a set of features may be determined from other images of the plurality of images of the containers (e.g., a third portion) associated with a specific pixel-based feature(s) and/or range(s) of predetermined predictions that may be different than the specific pixel-based feature(s) and/or range(s) of predetermined predictions associated with the images of the training dataset and the testing dataset. In other words, the other images (e.g., the third portion) may be used for feature determination/selection, rather than for training. The training dataset may be used in conjunction with the other images to determine the one or more features. The other images may be used to determine an initial set of features, which may be further reduced using the training dataset.

The training method 700 may train one or more machine learning models (e.g., one or more prediction models, neural networks, deep-learning models, etc.) using the one or more features at step 740. In one example, the machine learning models may be trained using supervised learning. In another example, other machine learning techniques may be used, including unsupervised learning and semi-supervised. The machine learning models trained at step 740 may be selected based on different criteria depending on the problem to be solved and/or data available in the training dataset. For example, machine learning models may suffer from different degrees of bias. Accordingly, more than one machine learning model may be trained at 740, and then optimized, improved, and cross-validated at step 750.

The training method 700 may select one or more machine learning models to build the classification model 630 at step 760. The classification model 630 may be evaluated using the testing dataset. The classification model 630 may analyze the testing dataset and generate classification values and/or predicted values (e.g., predictions) at step 770. Classification and/or prediction values may be evaluated at step 780 to determine whether such values have achieved a desired accuracy level. Performance of the classification model 630 may be evaluated in a number of ways based on a number of true positives, false positives, true negatives, and/or false negatives classifications of the plurality of data points indicated by the classification model 630.

For example, the false positives of the classification model 630 may refer to a number of times the classification model 630 incorrectly assigned a high prediction to a pixel associated with a low predetermined prediction. Conversely, the false negatives of the classification model 630 may refer to a number of times the machine learning model assigned a low prediction to a pixel associated with a high predetermined prediction. True negatives and true positives may refer to a number of times the classification model 630 correctly assigned predictions to pixels based on the known, predetermined prediction for each pixel/image. Related to these measurements are the concepts of recall and precision. Generally, recall refers to a ratio of true positives to a sum of true positives and false negatives, which quantifies a sensitivity of the classification model 630. Similarly, precision refers to a ratio of true positives a sum of true and false positives. When such a desired accuracy level is reached, the training phase ends and the classification model 630 may be output at step 790; when the desired accuracy level is not reached, however, then a subsequent iteration of the training method 700 may be performed starting at step 710 with variations such as, for example, considering a larger collection of images. The classification model 630 may be output at step 790. The prediction model 730 may be configured to determine predicted predictions for images that are not within the plurality of images used to train the prediction model.

Figure 8:
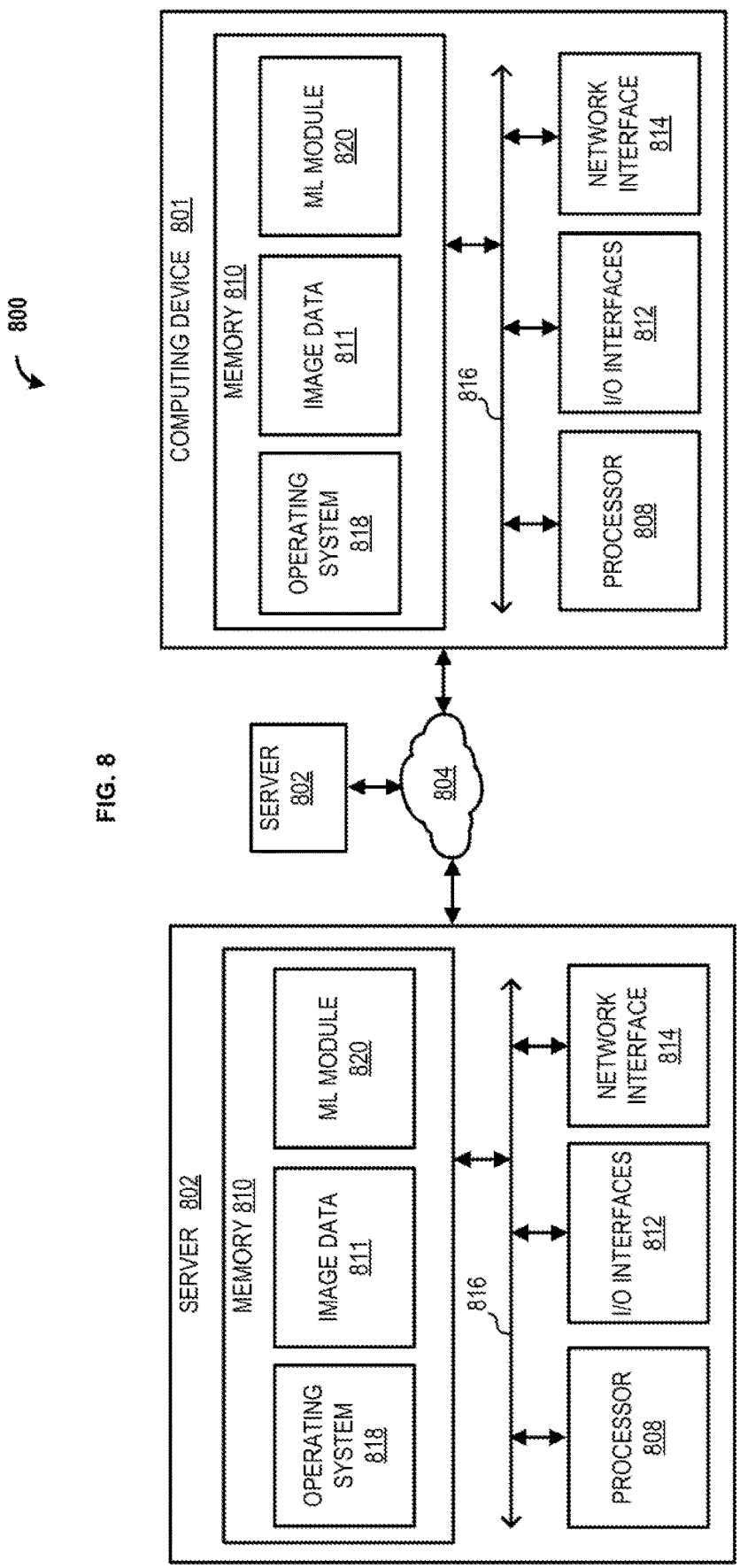
FIG. 8 shows an example system.

As discussed herein, the present methods and systems may be computer-implemented. FIG. 8 shows a block diagram depicting an environment 800 comprising non-limiting examples of a computing device 801 and a server 802 connected through a network 804, such as the network 106. The computing device 801 and/or the server 802 may be any one of devices of the system 100 shown in FIG. 1. In an aspect, some or all steps of any described method herein may be performed on a computing device as described herein. The computing device 801 may comprise one or multiple computers configured to store one or more of a machine learning module 820, image data 811, and the like. The server 802 may comprise one or multiple computers configured to store one or more of the machine learning module 820, the image data 811, and the like. Multiple servers 802 may communicate with the computing device 801 via the through the network 804.

The computing device 801 and the server 802 may each be a digital computer that, in terms of hardware architecture, generally includes a processor 808, memory system 810, input/output (I/O) interfaces 812, and network interfaces 814. These components (808, 810, 812, and 814) are communicatively coupled via a local interface 816. The local interface 816 may be, for example, but not limited to, one or more buses or other wired or wireless connections, as is known in the art. The local interface 816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 808 may be a hardware device for executing software, particularly that stored in memory system 810. The processor 808 may be any custom made or commercially available processor, a central processing unit (CPU), an auxiliary processor among several processors associated with the computing device 801 and the server 802, a semiconductor-based microprocessor (in the form of a microchip or chip set), or generally any device for executing software instructions. When the computing device 801 and/or the server 802 is in operation, the processor 808 may be configured to execute software stored within the memory system 810, to communicate data to and from the memory system 810, and to generally control operations of the computing device 801 and the server 802 pursuant to the software.

The I/O interfaces 812 may be used to receive user input from, and/or for providing system output to, one or more devices or components. User input may be received via, for example, a keyboard and/or a mouse. System output may comprise a display device and a printer (not shown). I/O interfaces 812 may include, for example, a serial port, a parallel port, a Small Computer System Interface (SCSI), an infrared (IR) interface, a radio frequency (RF) interface, and/or a universal serial bus (USB) interface.

The network interface 814 may be used to transmit and receive from the computing device 801 and/or the server 802 on the network 804. The network interface 814 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 814 may include address, control, and/or data connections to enable appropriate communications on the network 804.

The memory system 810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 810 may incorporate electronic, magnetic, optical, and/or other types of storage media. Note that the memory system 810 may have a distributed architecture, where various components are situated remote from one another, but may be accessed by the processor 808.

The software in memory system 810 may include one or more software programs, each of which comprises an ordered listing of executable instructions for implementing logical functions. In the example of FIG. 8, the software in the memory system 810 of the computing device 801 may comprise the training module 620 (or subcomponents thereof), the training data 510, and a suitable operating system (O/S) 818. In the example of FIG. 8, the software in the memory system 810 of the server 802 may comprise, the video data 824, and a suitable operating system (O/S) 818. The operating system 818 essentially controls the execution of other computer programs and provides scheduling, input-output control, file and data management, memory management, and communication control and related services.

For purposes of illustration, application programs and other executable program components such as the operating system 818 are illustrated herein as discrete blocks, although it is recognized that such programs and components may reside at various times in different storage components of the computing device 801 and/or the server 802. An implementation of the training module 520 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

FIG. 9 shows a flowchart of an example method 900 for storage analysis and management using computer vision techniques. The method 900 may be performed in whole or in part by a single computing device, a plurality of computing devices, and the like. For example, any of the devices shown in the system 100 may be configured to perform the method 900. The computing device(s) that performs the steps of the method 900 may comprise a classification model, such as the classification model 630.

A plurality of containers may be monitored by one or more imaging devices. The plurality of containers may comprise, for example, storage containers, shelves, buckets, boxes, etc. The plurality of containers may be used to store a number of objects, such as supplies, equipment, consumables, boxes, items, etc. The plurality of containers may be located in a fixed space, such as within an inventory room, a storage room, a closet, etc., Each container of the plurality of containers may store one or more of the objects, and each object—and/or category of object—may be inventoried. For example, a first container may store a first type of object (e.g., medical supply X), and a second container may store a second type of object (e.g., medical supply Y). As another example, a first container may store a first category of object (e.g., multiple objects that are similar but not identical), and a second container may store a second category, a type of object, a combination thereof, and/or the like.

The plurality of containers may be monitored by one or more imaging devices. For example, an imaging device, such as a camera or computing device comprising an optical sensor, may be situated proximate to the plurality of containers. The imaging device may capture a series of images of the plurality of containers at various times (e.g., predetermined times/according to a schedule) and/or at a set interval (e.g., every N minute, hour, day, etc.). At step 910, the computing device (e.g., one of the computing devices 102A, 102B, and 102N) may identify the plurality of containers depicted in at least one image of the series of images captured by the imaging device. The computing device and/or the imaging device may store the series of images at a collection module. The collection module may be resident at the imaging device or it may be resident at another device, such as a computing device, a server, a cloud device, etc.

At least one image of the series of images may be analyzed by an image processing module of the computing device. The image processing module may be resident at the imaging device or it may be resident at another device, such as a computing device, a server, a cloud device, etc. The image processing module may comprise a classification model. The classification model may comprise one or more machine learning models, artificial intelligence models, a combination thereof, and/or the like. In some examples, the classification model may be part of a machine learning module of a computing device, such as a server, a cloud device, etc.

At step 920, the computing device may determine a quantity of pixels of the at least one image. For example, the classification model of the computing device may determine, for each container of the plurality of containers, a quantity of pixels of the at least one image that are associated with/depicting a quantity of objects (e.g., a quantity of an inventoried item(s)) in the particular container. Based on the quantity of pixels corresponding to each container of the plurality of containers, the classification model may determine a current capacity of each container of the plurality of containers (e.g., an estimation of a number of objects presently stored in each container). The classification model may use one or more computer vision techniques, such as background subtraction, when determining the current capacity of each container. As another example, the classification model may use, or comprise, a neural network or any other suitable machine learning model, image classification model, etc., when determining the current capacity of each container. Some examples of background subtraction techniques the classification model may use may include a temporal average filter algorithm, a frame differencing algorithm, a mean filter algorithm, a running Gaussian average algorithm, a background mixture algorithm, a combination thereof, and/or the like. For example, the classification model may use background subtraction to determine an amount of change/difference between pixels in a reference image(s) of each container compared to the at least one image of each container. The reference image(s) may depict each container of the plurality of containers at a known capacity. For example, the reference image(s) may depict each container of the plurality of containers at a full capacity with respect to the particular object(s) presently stored in each container (e.g., full capacity may vary depending on object type/category).

The current capacity of a particular container may relate to an amount of the particular object/inventoried item present within that particular container. For example, the image processing module (and/or the classification model) may determine the current capacity of each container based on an area and/or a depth associated with/depicting the quantity of objects. The area and/or the depth may be determined based on a total quantity of pixels associated with each container minus the quantity of pixels associated with/depicting the quantity of objects present in each container (e.g., total pixels for each container minus those pixels that depict the object(s) present within each container). In making this determination, the image processing module (and/or the classification model) may use image segmentation methods or similar to identify pixels within the at least one image that correspond to edges of each container. Once the image processing module (and/or the classification model) determines the edges of each container, the image processing module (and/or the classification model) may classify, for each container, each pixel bounded by the edges of that particular container. Each pixel bounded by the edges of each particular container may be classified as being associated with an object or with the container itself. For example, the classification model may determine a plurality of pixel features associated with each pixel. The plurality of pixel features may be used by the classification model to determine a prediction as to whether the pixel is associated with an object or with the container itself. The background subtraction techniques discussed above may then be used by the image processing module (and/or the classification model) to determine a difference (e.g., an amount of change) between pixels in the reference image(s) of each container compared to the at least one image of each container. The difference (e.g., amount of change) between pixels in the reference image(s) of each container compared to the at least one image of each container may be indicative of the current capacity of that particular container. The current capacity may be expressed as a whole number (e.g., 100 pixels depicting an object(s)), a ratio (e.g., 100 out of 10,000 pixels depicting an object(s)) a percentage (e.g., 80% of pixels are classified as depicting an object(s)), a combination thereof, and/or the like.

As noted above, the current capacity of each container may relate to an amount of the particular object/inventoried item present within that particular container. At step 930, the computing device may determine that a threshold is satisfied, For example, the amount of the particular object/inventoried item may be associated with a first threshold quantity. The image processing module (and/or the classification model) of the computing device may determine the first threshold quantity based on a reference quantity of pixels within the reference image(s) and the quantity of pixels in the at least one image that are associated with/ depicting the quantity of objects present in each container. The reference quantity of pixels in the reference image(s) may depict one or more of the containers with a quantity of objects in each that corresponds to the first threshold quantity. The reference quantity of pixels may be expressed as a whole number. (e.g., 100 pixels), a ratio (e.g., 100 out of 10.000 pixels) a percentage (e.g., 80% of pixels are classified as depicting an object(s)), a combination thereof, and/or the like. The first threshold quantity may comprise a known/preset quantity of pixels classified as depicting an object (e.g., versus depicting the container itself). The reference quantity of pixels, as well as the first threshold quantity, may each be associated with a known/particular capacity of the corresponding container (e.g., based on corresponding quantities of pixels classified as depicting objects vs. containers).

The image processing module (and/or the classification model) may use optical character recognition (OCR) to identify each container. For example, the at least one image may depict an identifier (e.g., a label, sticker, etc.). Each identifier may be proximate to each container, affixed to each container, etc. Each identifier may comprise a string associated with a corresponding container and/or an object(s) present within the corresponding container. The string for each identifier may comprise any number of alphanumeric characters, symbols, etc. Each identifier may be associated with a particular object and/or category thereof (e.g., inventoried item) corresponding to the particular container.

The image processing module (and/or the classification model) may use OCR to determine each identifier depicted in the at least one image. The image processing module (and/or the classification model) may indicate the current capacity of each container and that container's particular identifier. For example, an identifier for one of the containers may comprise the numerical string of "12345." and the current capacity for that container may comprise a percentage value of "65%" (e.g., 65% pixels associated with that container are classified as depicting an object(s)). The image processing module (and/or the classification model) may store an indication of that identifier (e.g., the numerical string of "12345") along with an indication of the percentage value of "65%." Similar indications may be stored for each of the remaining containers.

The image processing module (and/or the classification model) may determine whether the current capacity of each container satisfies a first threshold of a plurality of thresholds at step 930. Each of the plurality of thresholds may correspond to a capacity level (e.g., a percentage, ratio, etc., indicating a level of "fullness" of the container). For example, the first threshold may correspond to a capacity level that indicates the particular container needs to be refilled and/or the corresponding object(s) stored therein need to be restocked, ordered, etc. The image processing module (and/or the classification model) may determine whether the current capacity of each container, as indicated by the at least one image, satisfies the first threshold. For example, the image processing module (and/or the classification model) may determine whether the current capacity of each container, as indicated by the at least one image, satisfies the first threshold by determining whether the current capacity of each container meets or exceeds (or falls below, as the case may be) the first threshold.

The classification model may determine that the first threshold is satisfied at step 940 based on the current capacity of each container. For example, the current capacity of each container may comprise a capacity level (e.g., 50%) that triggers the first threshold (e.g., capacity levels less than or equal to 50%, capacity levels greater than or equal to 50%, etc.). The capacity level of each container may correspond to a quantity of the particular object/inventoried item associated with that container (e.g., presently stored within that container). The first threshold quantity discussed above may comprise a quantity of pixels depicting the particular object/inventoried item that corresponds to the first threshold. The first threshold quantity may comprise a known/preset quantity of pixels classified as depicting an object (e.g., versus depicting the container itself). The reference quantity of pixels, as well as the first threshold quantity, may each be associated with a known/particular capacity of the corresponding container (e.g., based on corresponding quantities of pixels classified as depicting objects vs. containers). Determining whether the first threshold of the plurality of thresholds is satisfied may comprise determining whether the current capacity of the container is less than or equal to the first threshold quantity. For example, the first threshold quantity may correspond to an amount, ratio, percentage, etc., of pixels depicting the particular object/inventoried item. The first threshold may be satisfied when the current capacity of the container is less than or equal to the first threshold quantity. For example, the first threshold may comprise an indication of "less than or equal to 50% of pixels" (e.g., 50% of pixels depicting an object(s)), and the current capacity of the container may be indicative of "49% of pixels" depicting an object(s) within that container. The first threshold in this example may be satisfied, because the current capacity is less than the first threshold quantity.

The classification model may be trained using a plurality of training images. The plurality of containers may be present within each of the plurality of training images. At least one first training image of the plurality of training images may comprise the reference quantity of pixels discuss above. At least one second training image of the plurality of training images may comprise the quantity of pixels indicative of the current capacity of at least one container. The classification model may be trained using the at least one first training image and the at least one second training image.

At step 950, the computing device may cause at least one remedial action to be performed. For example, the image processing module (and/or the classification model) of the computing device may cause the at least one remedial action to be performed based on the first threshold being satisfied (e.g., based on the current capacity being less than or equal to the first threshold quantity). Causing the at least one remedial action to be performed may comprise causing the computing device or another computing device proximate to plurality of containers to output an alert. As another example, causing the at least one remedial action to be performed may comprise determining, based on the current capacity of at least one container, a quantity of at least one object (e.g., an inventoried item) presently stored within that at least one container. As a further example, causing the at least one remedial action to be performed may comprise sending a message. The message may comprise an identifier associated with at least one container. The message may also comprise a quantity/amount of at least one object (e.g., an inventoried item) presently stored within the container as indicated by the current capacity of that container.

A user interface may be provided at the computing device or at another computing device, such as a client device. The user interface may indicate a current capacity of each container of the plurality of containers. For example, the user interface may indicate which object(s)—or category(ies) of object(s)—is stored in each of the containers and a percentage or quantity of each presently stored in each container. The user interface may display an indication of the at least one remedial action discussed above (e.g., the alert, message, etc.). The user interface may depict other information as well, such as order history, inventory history, usage history, etc.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a computing device, at least one first image;
identifying, via a classification model, a plurality of containers present within the at least one first image;
determining, for each container of the plurality of containers, a quantity of pixels within the at least one first image associated with the corresponding container, wherein the quantity of pixels is indicative of a current capacity of the corresponding container;
determining, based on a reference quantity of pixels and the quantity of pixels within the at least one first image indicative of the current capacity of a first container of the plurality of containers, that a first threshold quantity is satisfied, wherein the reference quantity of pixels is associated with the first threshold quantity; and
causing, based on the first threshold quantity being satisfied, at least one remedial action to be performed.

2. The method of claim 1, wherein determining the first threshold quantity comprises: determining, using a background subtraction technique, the first threshold quantity.

3. The method of claim 1, wherein determining that the first threshold quantity is satisfied comprises:
determining that the current capacity of the first container is less than or equal to the first threshold quantity.

4. The method of claim 1, wherein causing the at least one remedial action to be performed comprises causing a second computing device to output an alert.

5. The method of claim 1, wherein the plurality of containers are associated with a plurality of portions of the at least one first image, and wherein the method further comprises:
determining, based on the at least one first image, at least one portion of the plurality of portions corresponding to the first container; and
determining, based on the at least one portion, at least one identifier present within the at least one portion.

6. The method of claim 5, wherein the current capacity of the first container is associated with at least one inventoried item, and wherein causing the at least one remedial action to be performed comprises:
determining, based on the current capacity of the first container, a quantity of the at least one inventoried item; and
sending a message comprising the at least one identifier and the quantity of the at least one inventoried item.

7. The method of claim 5, wherein the at least one identifier is associated with at least one inventory item.

8. The method of claim 1, further comprising:
receiving a plurality of training images, wherein the plurality of containers are present within each training image of the plurality of training images, and wherein the plurality of training images comprises:
at least one first training image comprising a reference quantity of pixels associated with a known capacity of the first container, and
at least one second training image comprising the quantity of pixels indicative of the current capacity of the first container; and
training, based on the plurality of training images, the classification model.

9. An apparatus comprising:
one or more processors; and
memory storing computer-executable instructions that, when executed by the one or more processors, cause the apparatus to:
receive at least one first image;
identify, via a classification model, a plurality of containers present within the at least one first image;
determine, for each container of the plurality of containers, a quantity of pixels within the at least one first image associated with the corresponding container, wherein the quantity of pixels is indicative of a current capacity of the corresponding container;
determine, based on a reference quantity of pixels and the quantity of pixels within the at least one first image indicative of the current capacity of a first container of the plurality of containers, that a first threshold quantity is satisfied, wherein the reference quantity of pixels is associated with the first threshold quantity; and
cause, based on the first threshold quantity being satisfied, at least one remedial action to be performed.

10. The apparatus of claim 9, wherein the computer-executable instructions that cause the apparatus to determine the first threshold quantity further cause the apparatus to:
determine, using a background subtraction technique, the first threshold quantity.

11. The apparatus of claim 9, wherein the computer-executable instructions that cause the apparatus to determine that the first threshold quantity is satisfied further cause the apparatus to:
determine that the current capacity of the first container is less than or equal to the first threshold quantity.

12. The apparatus of claim 9, wherein the computer-executable instructions that cause the apparatus to cause the at least one remedial action to be performed further cause the apparatus to cause a computing device to output an alert.

13. The apparatus of claim 9, wherein the plurality of containers are associated with a plurality of portions of the at least one first image, and wherein the computer-executable instructions further cause the apparatus to:

determine, based on the at least one first image, at least one portion of the plurality of portions corresponding to the first container; and determine, based on the at least one portion, at least one identifier present within the at least one portion.

14. The apparatus of claim 13, wherein the current capacity of the first container is associated with at least one inventoried item, and wherein the computer-executable instructions that cause the apparatus to cause the at least one remedial action to be performed further cause the apparatus to:

determine, based on the current capacity of the first container, a quantity of the at least one inventoried item; and send a message comprising the at least one identifier and the quantity of the at least one inventoried item.

15. The apparatus of claim 13, wherein the at least one identifier is associated with at least one inventory item.

16. The apparatus of claim 9, wherein the computer-executable instructions further cause the apparatus to:

receive a plurality of training images, wherein the plurality of containers are present within each training image of the plurality of training images, and wherein the plurality of training images comprises:

at least one first training image comprising a reference quantity of pixels associated with a known capacity of the first container, and at least one second training image comprising the quantity of pixels indicative of the current capacity of the first container; and train, based on the plurality of training images, the classification model.

17. A non-transitory computer-readable storage medium comprising processor-executable instructions that, when executed by one or more processors of a computing device, cause the computing device to:

receive at least one first image;

identify, via a classification model, a plurality of containers present within the at least one first image;

determine, for each container of the plurality of containers, a quantity of pixels within the at least one first image associated with the corresponding container, wherein the quantity of pixels is indicative of a current capacity of the corresponding container;

determine, based on a reference quantity of pixels and the quantity of pixels within the at least one first image indicative of the current capacity of a first container of the plurality of containers, that a first threshold quantity, of a plurality of threshold quantities, is satisfied, wherein the reference quantity of pixels is associated with the first threshold quantity; and cause, based on the first threshold quantity being satisfied, at least one remedial action to be performed.

18. The non-transitory computer-readable storage medium of claim 17, wherein the processor-executable instructions that cause the computing device to determine the first threshold quantity further cause the computing device to: determine, using a background subtraction technique, the first threshold quantity.

19. The non-transitory computer-readable storage medium of claim 17, wherein the plurality of containers are associated with a plurality of portions of the at least one first image, and wherein the processor-executable instructions further cause the computing device to:

determine, based on the at least one first image, at least one portion of the plurality of portions corresponding to the first container; and determine, based on the at least one portion, at least one identifier present within the at least one portion.

20. The non-transitory computer-readable storage medium of claim 19, wherein the at least one identifier is associated with at least one inventory item.

* * * * *